March 4, 1958 C. R. BROMAN 2,825,333
FLUID FLOW REGULATOR FOR FLEXIBLE TUBING
Filed Jan. 24, 1955
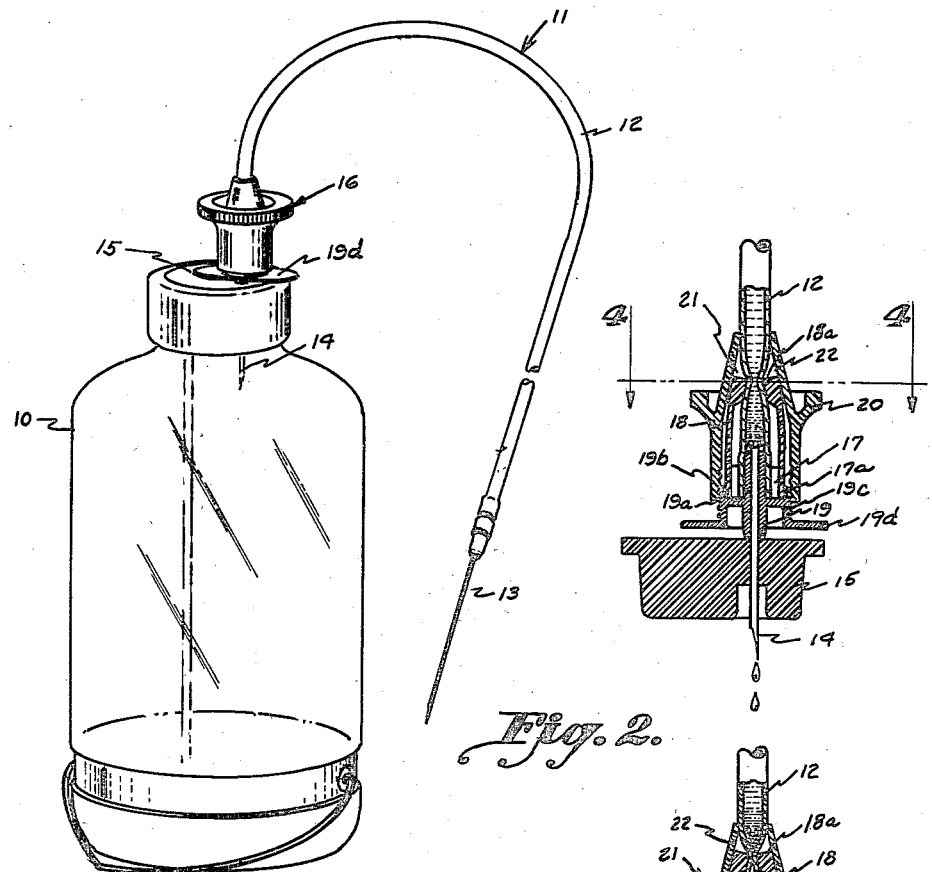
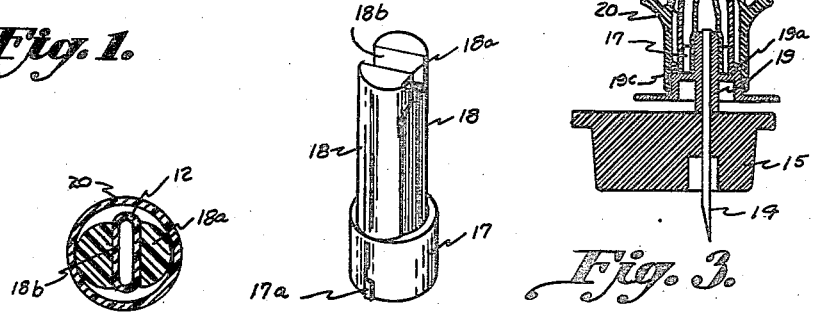
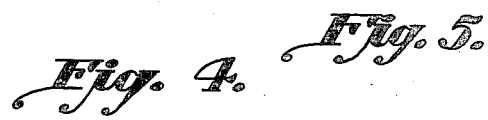
Cyrus R. Broman
INVENTOR.
BY Jerome F. Fallon

United States Patent Office 2,825,333
Patented Mar. 4, 1958

2,825,333

FLUID FLOW REGULATOR FOR FLEXIBLE TUBING

Cyrus R. Broman, Evanston, Ill., assignor to Baxter Laboratories, Inc., Morton Grove, Ill.

Application January 24, 1955, Serial No. 483,545

2 Claims. (Cl. 128—214)

This invention relates to a fluid flow regulator for flexible tubing and, more particularly, to a regulator for the flexible tubing of a blood collection set.

In the collection and administration of parenteral fluids, it has been considered necessary to provide some means for regulating the flow of fluid through the tubing which conducts the fluid either from the donor to the collection container in the case of blood, or from the bottle source to the intended recipient. Providing such regulation in a blood collection set has been a difficult problem due to the size and thickness of the tubing to which the regulating means has been applied. In many instances the tubing is provided with a rather large bore so that sufficient quantity of blood remains therein after donation to serve as a serology sample upon which typing and grouping tests, Wassermann tests, and the like, can be performed. The use of a large bore necessitates providing thick walls in the tubing in order to prevent wall collapse when the set is connected to an evacuated blood collection container. The regulators heretofore provided for thinner-walled administration sets, as for example the "clothespin" type clamp, have not been able to provide efficient and delicate regulation of fluid flow through such thick-walled, large bore tubing. In fact, many such collection sets have been furnished without any regulating means whatsoever, the doctor supervising the blood donation having to resort to the use of his own hemostat. Even if the hemostat is handy, its structure does not permit a range of regulation, since it is an "off-on" type clamp and operates to completely close off a liquid conduit.

Another important advantage of my regulator is that it can be readily manipulated with one hand. This feature is especially significant in cases where the person supervising the collection requires a free hand for manipulating the donor needle.

The regulator of my invention is superior to the previously used regulating means in that it is adapted to provide efficient and delicate regulation of fluid flow, yet is inexpensive to manufacture while being rugged in construction.

The regulator of my invention includes a collar adapted to be mounted on flexing tubing. The collar, in turn, is provided with integral, upstanding side portions. These upstanding side portions are so constructed and arranged that when the collar is inserted into an internally tapered cap, they will be pressed together in a chuck-like action to provide the aforementioned delicate regulation of fluid flow.

It is, therefore, an object of my invention to provide a new and superior type of regulator for flexible tubing. Another object is to provide a regulator for flexible tubing which is relatively inexpensive to produce. Still another object is to provide a regulator for flexible tubing which permits delicate and accurate regulation of fluid flow. Yet another object is to provide a regulator for the flexible tubing of a blood collection set; and further where the regulator is mounted on the stopper puncture needle of a blood collection set. Other objects and advantages of my invention will be seen as the specification proceeds.

My invention will be explained in conjunction with the accompanying drawing in which Fig. 1 is a perspective view of a blood collection apparatus equipped with the regulator of my invention. Fig. 2 is an enlarged, elevational view, partially in section, of a fragmentary portion of Fig. 1. Fig. 3 is an elevational view, partially in section, similar to Fig. 2 but showing the regulator of my invention in a "shut off" position; Fig. 4 is a cross-sectional view taken along the line 4—4 of Fig. 2; and Fig. 5 is a perspective view of the collar member of my regulator as shown in Figs. 2 and 3.

Referring to the drawing and, in particular, Fig. 1, a conventional blood collection apparatus is shown which consists of an evacuated blood collection bottle 10 and a blood collection set generally designated 11. Collection set 11 includes flexible tubing 12 and is provided at one end thereof with donor needle 13, which is adapted to be inserted into the vein of a patient (not shown). The other end of collection set 11 is provided with yet another needle 14, adapted to be inserted into the stopper 15 of blood collection bottle 10. The regulator of my invention, generally designated 16, is mounted on flexible tubing 12 of collection set 11. In the instance of using my regulator in conjunction with a blood collection set, I prefer to attach the regulator to the hub portion of stopper puncture needle 14. This results in a more rigid regulator mounting, which contributes to the ready operation of the regulator by only one hand. Other advantages from affixing the regulator to the needle hub will appear as my invention is described in detail.

Regulator 16 is shown in enlarged, elevational view in Fig. 2 and includes a collar 17. Integral with collar 17 and extending longitudinally therefrom are upstanding side portions 18, shown in enlarged form in Fig. 5. In the preferred embodiment of my invention, the collar and side portions are constructed of flexible nylon plastic material and are made by molding. Collar 17 has an internal bore of a size sufficient to receive flexible tubing 12.

Collar 17 is mounted on needle hub 19. In the embodiment shown, hub 19 is provided with an integral cup-shaped annular portion 19a in which collar 17 is inserted and maintained therein against rotation by ribs 17a of collar 17, which fit into slots 19b provided in the inner wall of cup-shaped portion 19a. The outer wall of cup-shaped portion 19a is threaded, as indicated at 19c. Threadably received on cup-shaped portion 19a is cap 20.

Cap 20 has a longitudinal passage 21 extending therethrough. Passage 21, at one end thereof, is of a size adapted to receive collar 17 and, at the other end, is of a size to receive tubing 12. The inner wall of cap 20, which forms passage 21, is tapered inwardly as at 22 to accommodate receiving the larger diameter collar 17 at one end and the smaller diameter tubing 12 at the other end.

Thus it is to be seen, especially from a comparison of the positions of cap 20 in Figs. 2 and 3, that upon screwing cap 20 downwardly on threads 19c, the upstanding side portions 18 are forced together under the pressure exerted thereon by tapered shoulder portion 22. The pressing action imparted to upstanding side portions 18 causes them to exert a chuck-line action on tubing 12 through integral protuberances 18a.

By referring now to Fig. 4, it can be seen that the embodiment of my invention includes protuberances 18a, which have a semi-circular cross-section at least at the ends thereof. It will be immediately apparent to those skilled in the art that the circular cross-section picture is not the only cross-section suitable for achieving chuck-like action, inducing constricting of tube 12. However, it is noted that a semi-elliptical cross-section can only be used if the major axis of the ellipse extends perpendicularly to the bearing faces 18b of protuberances 18a.

It is further to be noted that the particular design of parts as shown is not essential to the successful operation of my regulator. For example, needle hub 19 can be provided integral with the collar 17, collar 17 being provided with the external threads for mounting cap 20.

However, I have found that the provision of integral flange 19d extending outwardly from the base of cup-shaped portion 19a constitutes to the usefulness of my invention. It acts as a finger bearing surface to facilitate puncture of stopper 15 by needle 14 as well as acting as a stop for the threadable engagement of cap 20 on cup-shaped portion 19a. Once needle 14 is inserted into stopper 15, flange 19d acts as a stabilizer to prevent tipping of needle 14 during manipulation of regulator 16 which could result in needle breakage or expanding of the puncture whereby air might infiltrate container 10 and destroy the vacuum therein.

An obvious modification of needle hub 19 is to provide the base of cup-shaped portion 19a and flange 19d as coplanar elements, rather than the stepped design pictured and still achieve the advantages indicated above, i. e., supporting collar 17 and the lower portion of side portions 18, providing a finger pressure surface for puncture, and acting as a stabilizer against needle tilting. I have resorted to the stepped-design in order to achieve maximum threaded length on cup-shaped portion 19a without having to use a longer and more expensive needle.

I do not limit the use of my regulator to the particular embodiment shown, wherein collar 17 is secured to needle hub 19, since it will be apparent to those skilled in the art that my regulator can be located at any position on tubing 12 as by securing collar 17 thereto so as to adapt it for use in conjunction with a parenteral administration set as well as a blood collection set.

Operation

When the regulator of my invention is used in a blood collection apparatus, it is intended to be supplied as part of the collection set. When this is the case, the blood collection set is clamped in a shut-off position by tightening cap 20 on hub 19. Stopper puncture needle 14 is inserted into the stopper 15 of blood collection container 10. Donor needle 13 is then inserted into the vein of a donor. Regulator 16 is then opened by unscrewing cap 20 to an extent necessary to achieve the desired flow, whereupon blood is caused to flow from the donor into evacuated container 10.

The foregoing detailed description has been given for clearness of understanding only, and no unnecessary limitations are to be inferred therefrom, as modifications will be obvious to those skilled in the art.

I claim:

1. In combination with a hollow puncture needle, a needle hub receiving and secured to the end of the needle opposite the point thereof, flexible tubing enclosing a portion of said needle hub, said needle hub being provided with an outwardly-extending cup-shaped portion having external threads, resilient jaws carried by said needle hub and extending upwardly therefrom for engagement with said tubing, and a rotatable cap member having its lower inner portion threadedly engaging the threads of said cup-shaped needle hub portion, said cap member having at its top a longitudinal passage tapered inwardly and engageable with said jaws to press the same toward each other for closing said tubing when said cap is rotated to bring the tapered passage thereof toward said needle hub.

2. The structure of claim 1, in which the needle hub portion enclosing said needle is centered within the cup-shaped portion of the hub and in which said cup-shaped portion is provided with a laterally-extending bottom flange.

References Cited in the file of this patent

UNITED STATES PATENTS

| | | |
|---|---|---|
| 477,397 | Woodward | June 21, 1892 |
| 492,580 | Hadley | Feb. 28, 1893 |
| 1,865,012 | Jackson | June 28, 1932 |
| 2,309,302 | Butler | Jan. 26, 1943 |
| 2,652,222 | McCowan | Sept. 15, 1953 |